(12) United States Patent
Yahagi (10) Patent No.: US 8,015,503 B2
(45) Date of Patent: Sep. 6, 2011

(54) PART TABLE CREATING APPARATUS AND PART TABLE CREATING METHOD

(75) Inventor: Koichi Yahagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 903 days.

(21) Appl. No.: 11/727,790

(22) Filed: Mar. 28, 2007

(65) Prior Publication Data

US 2007/0229551 A1    Oct. 4, 2007

(30) Foreign Application Priority Data

Mar. 31, 2006  (JP) .................................. 2006-096508

(51) Int. Cl.
*G06F 3/048* (2006.01)

(52) U.S. Cl. ........ 715/790; 715/766; 715/788; 715/964; 715/211; 715/231; 715/232; 715/252; 715/253

(58) Field of Classification Search .......................... None
See application file for complete search history.

(56) References Cited

U.S. PATENT DOCUMENTS

| | | | |
|---|---|---|---|
| 5,737,558 A * | 4/1998 | Knight et al. ................. | 715/788 |
| 5,838,318 A * | 11/1998 | Porter et al. .................. | 715/790 |
| 5,943,243 A | 8/1999 | Sherlekar et al. | |
| 7,366,978 B1 * | 4/2008 | Jones et al. ................... | 715/209 |
| 7,627,815 B2 * | 12/2009 | Shima ........................... | 715/243 |
| 2003/0182152 A1 * | 9/2003 | Nakajima et al. ................. | 705/1 |
| 2005/0283734 A1 * | 12/2005 | Santoro et al. ................ | 715/765 |
| 2008/0255969 A1 * | 10/2008 | Nakajima et al. ............... | 705/28 |
| 2009/0307583 A1 * | 12/2009 | Tonisson ....................... | 715/246 |

FOREIGN PATENT DOCUMENTS

| | | |
|---|---|---|
| JP | 7-182397 A | 7/1995 |
| JP | 2001-8428 A | 1/2001 |

* cited by examiner

*Primary Examiner* — Dennis-Doon Chow
*Assistant Examiner* — Anil N Kumar
(74) *Attorney, Agent, or Firm* — Birch, Stewart, Kolasch & Birch, LLP (57) ABSTRACT

To solve an overlap between a part table and components automatically and adequately in a drawing using a CAD. In a part table creating method for creating a part table including a plurality of rows of CAD data, an overlap between the part table and other geometric elements is detected. When the overlap is detected, the height of the respective rows of the part table is reduced to H1. When the overlap between the part table and the other geometric elements still remains even when the respective rows of the part table is reduced to the height H1, the number of overlapped rows between the part table and the geometric element are obtained. The portion of the overlapped rows is separated and moved in the direction to avoid the overlap with the geometric elements to separate into an original part table and a destination part table.

16 Claims, 9 Drawing Sheets

PART TABLE CREATING APPARATUS AND PART TABLE CREATING METHOD

CROSS-REFERENCE TO RELATED APPLICATIONS

The present application claims priority under 35 USC 119 to Japanese Patent Application No. 2006-096508 filed on Mar. 31, 2006 the entire contents of which are hereby incorporated by reference.

BACKGROUND OF THE INVENTION

1. Field of the Invention

The present invention relates to a part table creating apparatus for creating a part table for showing specifications of a plurality of components in a plurality of rows by each component on a CAD data and a part table creating method.

2. Description of Background Art

Recently, many drawings, such as mechanical drawings, electrical diagrams, and architectural drawings are drawn using CAD (Computer Aided Design). The CAD is convenient because parts may be registered in advance for use for different purposes or arrangements of geometric elements once drawn may be shifted and dimensions or shapes may be easily corrected.

A drawing generally includes a drawing frame, a drawing area for the geometric element as a target product of manufacture, a title table in which a series of bibliographical descriptions are listed, and a part table for listing the specifications of a plurality of components of the geometric element by each component in a plurality of rows. The drawing area is provided at the center of the drawing frame, and the title table is provided at the lower right portion within the drawing frame. In contrast, the part table is provided in a blank space after having provided the geometric element and the title table, that is, for example, the upper right portion or the upper left portion within the drawing frame.

Although the geometric element is preferably shown clearly without being overlapped with the title table or the part table, there may be a case of being overlapped depending on the layout. In view of such circumstances, there is proposed a method of solving such overlapping by adjusting the arrangement of the drawing area automatically when an overlap of the drawing area with the drawing frame is detected. See, for example JP-A-7-182397.

In a method described in JP-A-7-182397, when the overlap of the geometric element with the drawing frame is detected, the entire drawing area is simply shifted. Therefore, when the part table is large, it is considered that the overlap might not be solved even though the drawing area is shifted in any directions of upward, downward, left and right with the method disclosed in JP-A-7-182397.

SUMMARY AND OBJECTS OF THE INVENTION

In view of such a problem, it is an object of an embodiment of the present invention to provide a part table creating apparatus and a part table creating method which can solve an overlap between a part table and components automatically and adequately.

According to an embodiment of the present invention, a part table creating apparatus is provided for creating a part table showing specifications of a plurality of components of a geometric element in a plurality of rows by each component on CAD data, including means for detecting an overlap of the part table and another geometric element, means for finding the number of rows overlapping with the geometric element from the plurality of rows of the part table when the overlap is detected, and means for separating a portion of the components corresponding to the overlapped rows from the part table and for moving the same to a position for avoiding the overlap with the geometric element, and for creating a new part table.

In this manner, when the overlap between the geometric element and the part table is detected, the overlap between the part table and the components may be solved automatically and adequately by separating and moving the portion of the overlapped rows from other portions which do not overlap and creating a new part table.

According to an embodiment of the present invention, a configuration includes input means used by an operator and the moving means for determining the direction to move the portion of the overlapped rows on the basis of information obtained from the input means. Accordingly, a layout setting can be achieved according to the preference of the operator, so that the layout flexibility is improved.

According to an embodiment of the present invention, a configuration includes row contracting means for reducing the height of the rows in the part table when the overlap is detected, and the portion of the overlapped rows is moved to the direction to avoid the overlap with the geometric element only when the overlap is not avoided even though the height of the respective rows of the part table is reduced to a predetermined height by the row contracting means. Accordingly, the layout change is reduced and the same layout is maintained as much as possible.

According to an embodiment of the present invention, a part table creating method is provided for creating a part table showing specifications of a plurality of components of a geometric element in a plurality of rows by each component on the CAD data, including a step of detecting an overlap of the part table with another geometric element, a step of obtaining the number of rows overlapped with the geometric element when the overlap is detected, and a step of moving the portion of the overlapped rows to the direction which avoids the overlap with the geometric element.

In this manner, when the overlap between the geometric element and the part table is detected, the overlap between the part table and the component is solved automatically and adequately by separating and moving the portion of the overlapped rows from other portions which do not overlap.

According to the part table creating apparatus and the part table creating method according to the invention, when the overlap between the geometric element and the part table is detected, the portion of the overlap between the part table and the components is solved automatically and adequately by separating and moving the portion of the overlapped rows from other portions which do not overlap.

Therefore, even when there is no sufficient space for moving the component upward, downward, to the left and to the right, both the components and the part table can be shown clearly using the blank space effectively without reducing the scale of the components in the drawing area or changing the setting of the paper size for the entire drawing to the paper one size bigger.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A part table creating apparatus according to the invention is presented as a CAD system 10 for creating a drawing using a computer. A part table creating method according to the invention is performed using the CAD system 10. Hereinafter, the CAD system 10 and the part table creating method according to the embodiment will be described. Referring now to attached FIG. 1 to FIG. 9 the CAD system 10 and the part table creating method will be described on the basis of embodiments.

Figure 1:
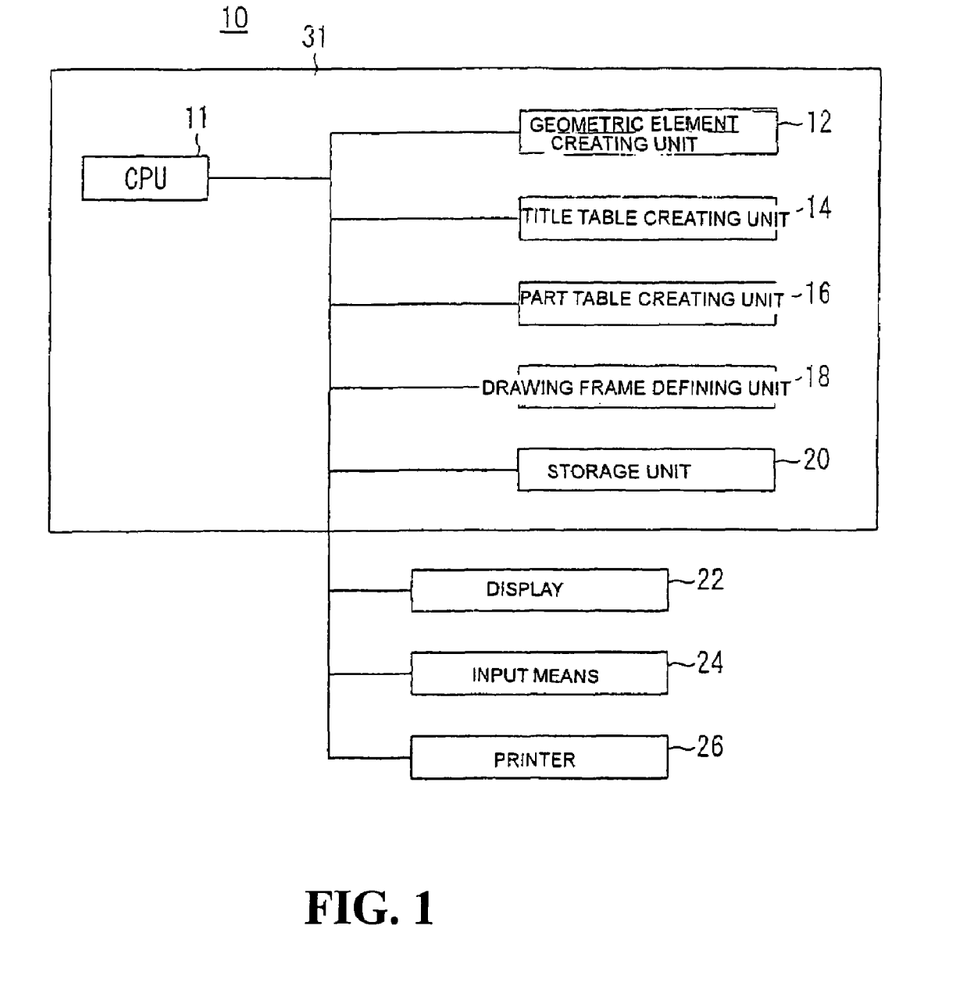
FIG. 1 is a block diagram of a CAD system according to an embodiment.
Figure 2:
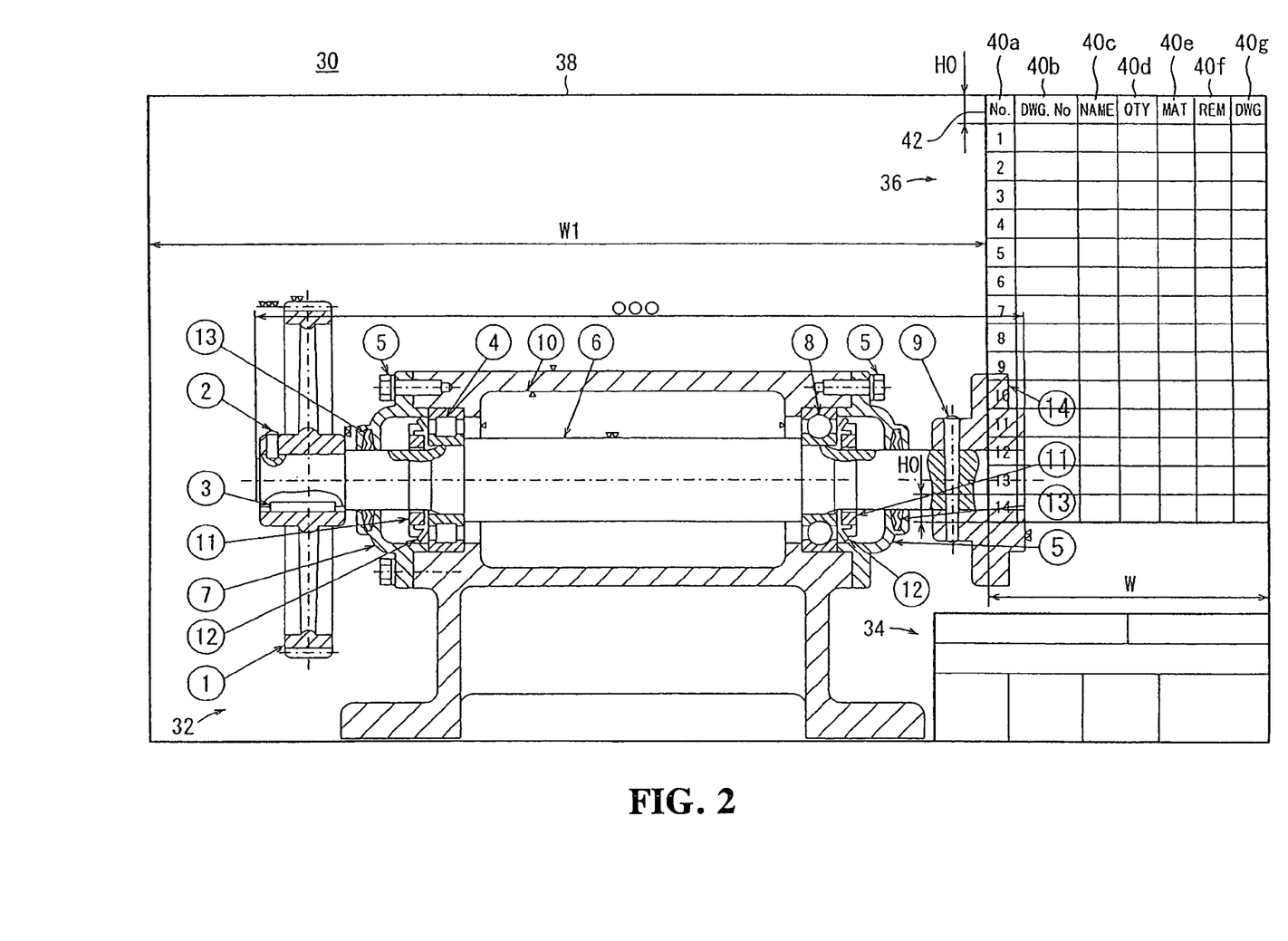
FIG. 2 is a mechanical drawing created by the CAD system.

As shown in FIG. 1, the CAD system 10 includes a CPU 11 for generally controlling the system, a geometric element creating unit 12, a title table creating unit 14, a part table creating unit 16, a drawing frame defining unit 18, a storage unit 20 for storing the created CAD data, a display 22 for displaying the drawing on the basis of the CAD data, input means 24 operated by an operator, and a printer 26 for printing the drawing on the basis of the CAD data, and create the CAD data of, for example, a drawing 30 shown in FIG. 2 on the basis of the operation from the input means 24.

The CPU 11, the geometric element creating unit 12, the title table creating unit 14, the part table creating unit 16, the drawing frame defining unit 18, and the storage unit 20 are provided in a computer body 31. The CPU 11 and the storage unit 20 from these members are hardware components, and other creating units are software functioning units which realize jobs by reading and executing a program by the CPU 11. The input means 24 includes, for example, a keyboard or a pointing device such as a mouse or a tablet.

FIG. 2 illustrates the drawing 30 in which a geometric element 32 created by the geometric element creating unit 12, a title table 34 created by the title table creating unit 14, a part table 36 created by the part table creating unit 16, and a drawing frame 38 defined by the drawing frame defining unit 18 are set at the beginning, and the part table 36 is not modified yet.

The drawing frame 38 indicates an outer frame of the drawing 30, and all other elements are basically placed within the drawing frame 38. The geometric element 32 represents a manufactured product, and includes, in the case of the mechanical drawing for example, three views of a predetermined reduction scale and the dimension lines thereof, and processing signs. The title table 34 is a table in which bibliographical description including the name of the drawing, a reference number, a stamp column, the name of a drafter, a date of creating the drawing, reducing scale is shown together, and is shown at the lower right portion within the drawing frame 38.

The part table 36 is a table showing specifications of a plurality of components of the geometric element in a plurality of rows by each component, and a plurality of rows are provided downwardly from the right upper portion in the drawing frame 38, for example. The part table 36 includes, for example, a column for the item number 40a, a column for the part drawing number 40b, a column for the part name 40c, a column for the number of parts 40d, a column of the material of the part 40e, and a column for remarks 40f and a column 40g for confirming whether or not the drawing exists for the corresponding components. The topmost row of the part table 36 includes an index row 42, and the rows from the second row on are for filling information corresponding to the respective components. The rows from the second row on are arranged in sequence of the item number in the column for the item number 40a. In the example shown in FIG. 2, fourteen rows are provided corresponding to fourteen parts which constitute the geometric element 32. The part table 36 is effective for indicating an assemble drawing for a machine which includes a plurality of components. It is also applicable for indicating an electrical circuit including a number of electric components.

Figure 3:
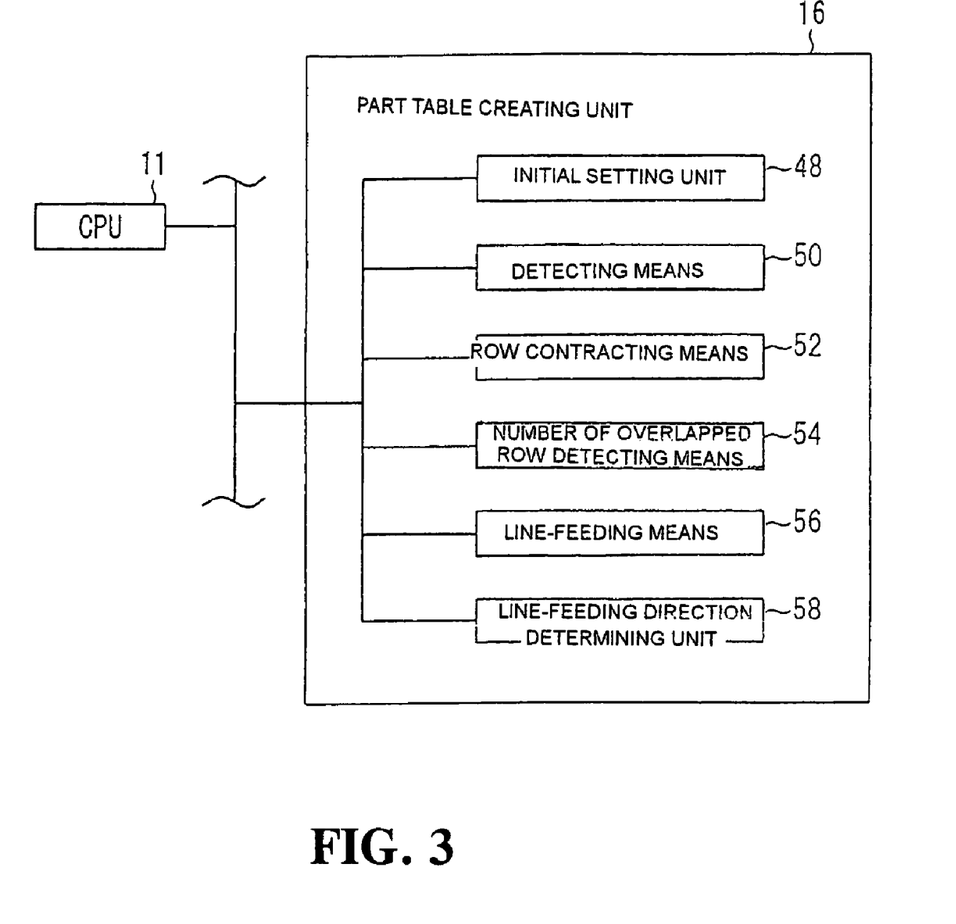
FIG. 3 is a block diagram of a part table creating unit.

As shown in FIG. 3, the part table creating unit 16 includes an initial setting unit 48 for the part table 36, overlap detecting means 50 for detecting an overlap between the part table 36 and the geometric element 32, and row contracting means 52 for reducing the height of the respective rows when the overlap is detected by the overlap detecting means 50. The initial setting unit 48 performs an initial setting according to the number of the geometric elements 32, and provides the part table 36 at a default position initially (for example, a position to arrange downward from the upper right portion of the drawing frame 38 as shown in FIG. 2).

The part table creating unit 16 includes a number of overlapped rows detecting means 54 for finding the number of rows overlapped with the geometric element 32 from the plurality of rows of the part table 36 when the overlap occurs even when the height of the respective rows of the part table 36 is reduced to a predetermined height by the row contracting means 52, line-feeding means 56 for moving the portion of the overlapped rows obtained by the number of rows detecting means 54 in the direction which avoids the overlap with the geometric element 32 (hereinafter, referred to as "line-feeding"), and line-feeding direction determining unit 58 for determining the direction of line-feeding by the line-feeding means 56 on the basis of information obtained from the input means 24.

Figure 4:
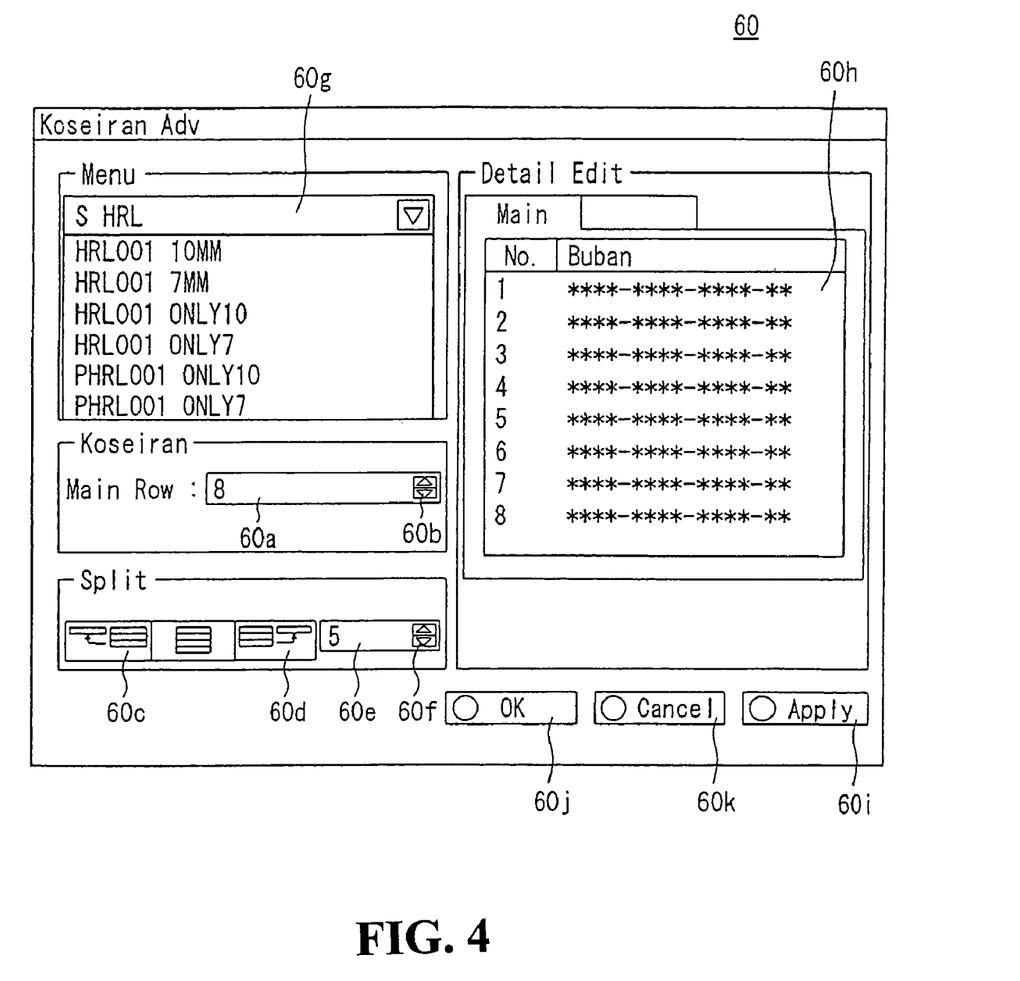
FIG. 4 is a drawing showing a setting dialogue box displayed on a display screen of a display by a line-feeding direction determining unit.

The line-feeding direction determining unit 58 displays a setting dialogue box 60 shown in FIG. 4 on a display screen of the display 22, and inputs information on the basis of the operation of the input means 24 by the operator.

As shown in FIG. 4, the setting dialogue box 60 includes a number of rows input window 60a, a spin button 60b for enabling the value in the number of rows input window 60a to be increased or decreased by a clicking operation, a leftward line-feeding button 60c, a rightward line-feeding button 60d, a number of line-feeding rows display window 60e for indicating the number of line-feeding rows, and a spin button 60f for enabling the value in the number of line-feeding rows display window 60e to be increased or decreased.

The number of rows input window 60a and the spin button 60b are portions for initially inputting and setting the number of rows in the part table 36. The leftward line-feeding button 60c and the rightward line-feeding button 60d are buttons for specifying the direction of line-feeding by the line-feeding means 56. Line-feeding toward the left is specified by clicking the leftward line-feeding button 60c, and line-feeding toward the right is specified by clicking the rightward line-feeding button 60d. The setting dialogue box 60 does not include buttons for specifying line-feeding upward and downward. However, since the part table 36 generally includes the rows arranged downward from the index row 42, it is easily understood that the direction of line-feeding may be one of the left and right directions. The line-feeding rows display window 60e and the spin button 60f may be used to increase and decrease the automatically obtained number of line-feeding according to the preference of the operator.

The setting dialogue box 60 includes a part table setting window 60g for selectively setting the type of the part table, a detail edit window 60h for inputting information of the respective rows of the part table 36, an apply button 60i for applying the edited results, an OK button 60j for applying the edited results and ending the setting, and a Cancel button 60k for ending the setting without applying the edited results.

Figure 5:
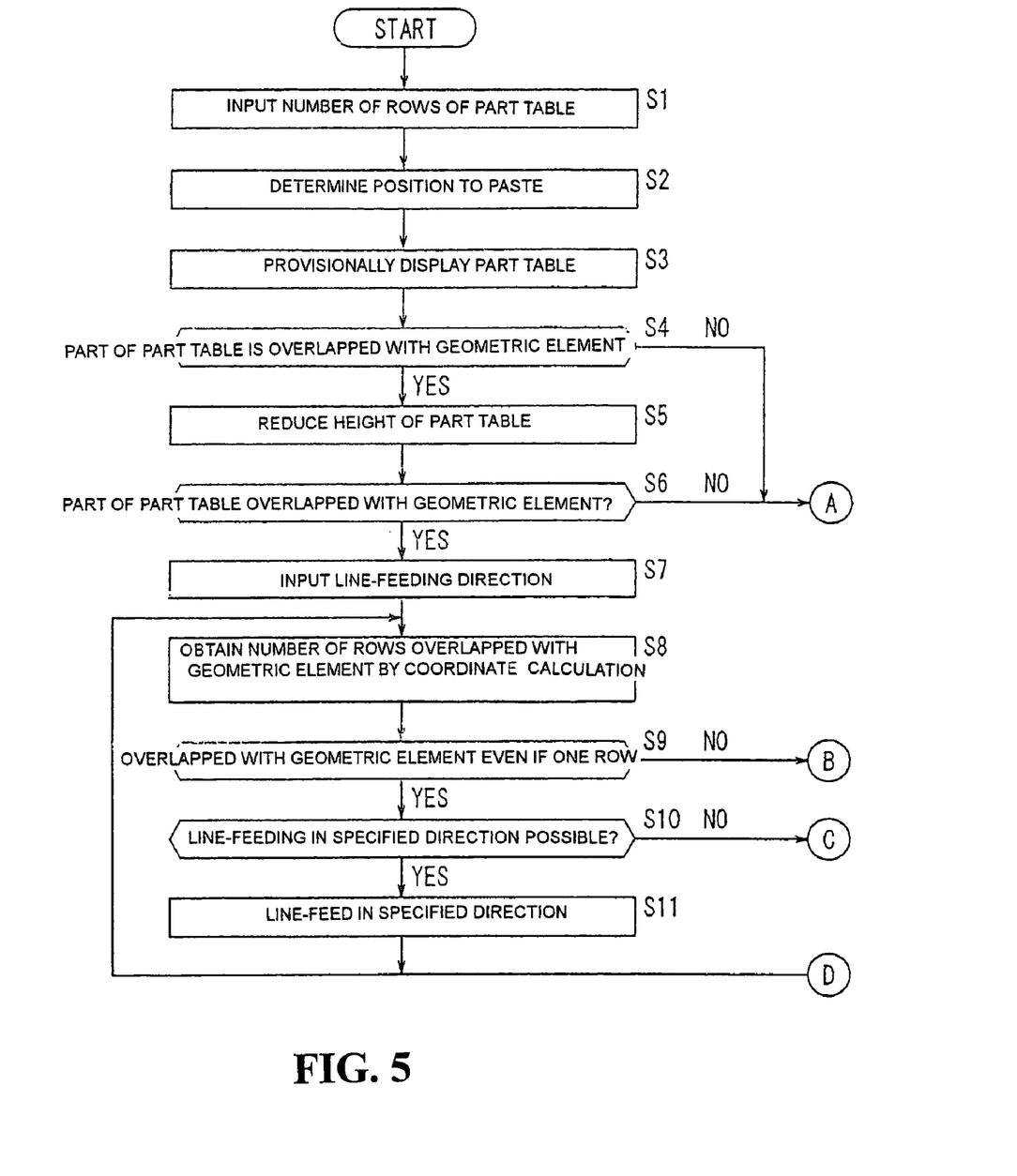
FIG. 5 is a flowchart (No. 1) showing a procedure of a part table creating method according to the embodiment.
Figure 6:
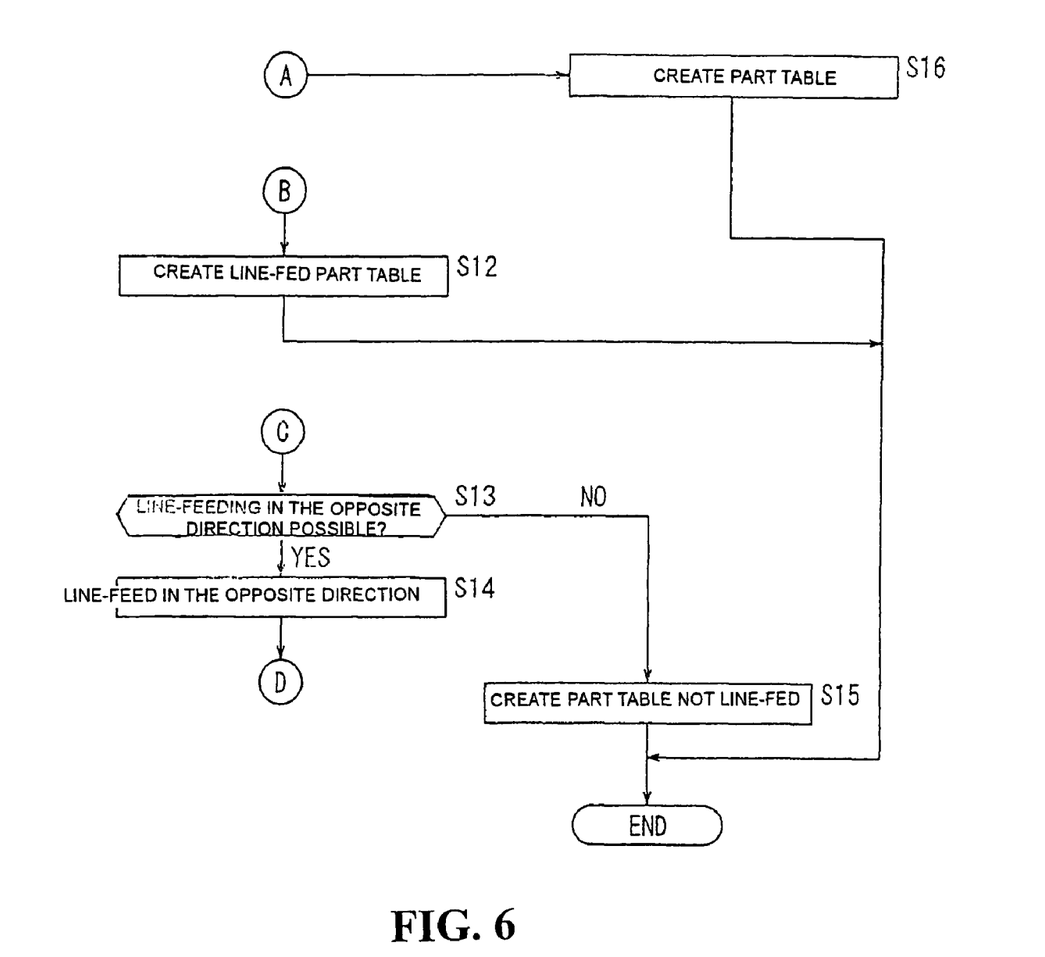
FIG. 6 is a flowchart (No. 2) showing a procedure of the part table creating method according to the embodiment.

Referring now to FIG. 5 and FIG. 6, a part table creating method performed using the CAD system 10 configured as described thus far will be described. In the following description, the process proceeds in the order of noted Step No. unless otherwise specified. On the creating drawings, the drawing frame 38, the geometric element 32 and the title table 34 other than the part table 36 are assumed to be created in advance on the basis of the drawing frame defining unit 18, the geometric element creating unit 12, and the title table creating unit 14.

In Step S1 in FIG. 5, the setting dialogue box 60 is displayed by a predetermined operation of the operator, and the number of rows of the part table 36 is entered in the number of rows input window 60a. An arbitrary default value except for "0" may be set in the number of rows input window 60a provisionally at the beginning, or a numeral according to the type of the parts which constitute the geometric element 32 and is detected automatically, may be set provisionally. In this case, when the input operation is not performed, the provisional setting may be used as an effective set value. The input of the number of rows input window 60a may be done by entering the numeral directly using the ten keys of the keyboard, or by increasing or decreasing the number by the spin button 60b.

In Step S2, the reference position of the part table 36 is set by the predetermined operation of the input means 24.

In Step S3, the part table 36 is provisionally set on the basis of the information set by the operation of the number of rows input window 60a and the input means 24 under the operation of the initial setting unit 48, and is provisionally displayed on the display 22 (see FIG. 2).

In Step S4, whether or not there is an overlap between the part table 36 and the geometric element 32 is detected under the operation of the detecting means 50. The detection of the overlap is performed by a predetermined coordinate calculation. When the overlap is detected, the procedure goes to Step S5, and when the overlap is not detected, the provisional display is set as the effective display (Step S16) and is registered in the CAD data to end the process shown in FIG. 5 and FIG. 6.

In Step S5, the height of the index row 42 and the respective rows of the part table 36 is reduced under the operation of the row contracting means 52. In other words, the initial height H0 of the index row 42 and the respective rows (see FIG. 2) is reduced to a lower height H1 (see FIG. 7). The height H1 is preset as a height which is low to an extent which allows the characters in the part table 36 to stay readable.

In Step S6, whether or not there is an overlap between the part table 36 and the geometric element 32 is detected under the operation of the detection means 50 as in Step S5. When the overlap is detected, the procedure goes to Step S7, and when the overlap is not detected, the procedure in Step S16 is performed, and then the process shown in FIG. 5 and FIG. 6 are ended.

The contracting process in Step S5 and the overlap detection process in Step S6 may be performed step-by-step. That is, it is also possible to reduce the initial height H1 minutely instead of reducing to the height H1 at one time, and to proceed to Step S16 when the problem of overlap is solved, and to proceed to Step S7 when the overlap is not eliminated.

In Step S16, no line-feeding is performed, and the part table 36 obtained at this point is employed effectively, and is registered in the CAD data, and then the process in FIG. 5 and FIG. 6 is ended.

On the other hand, in Step S7, the direction of line-feeding of the overlapped portion is specified by clicking any one of the leftward line-feeding button 60c and the rightward line-feeding button 60d. When the direction of line-feeding is uniquely determined on the basis of the reference position of the part table 36, the direction of line-feeding may be determined while omitting the process Step S7 or irrespective of the specification. For example, when the part table 36 is provided at the upper right portion within the drawing frame 38 as shown in FIG. 2, the line-feeding cannot be performed further to the right. Therefore, it may be determined to automatically line-feed to the left.

In Step S8, the number of rows which overlap with the geometric element 32 from the plurality of rows of the part table 36 is obtained by a predetermined coordinate calculation. In the case shown in FIG. 7, it is found that four rows from the bottom, that is, from the 10th to 14th rows are overlapped.

In Step S9, whether or not the number of overlapped rows obtained by the number of rows detecting means 54 is "1" or more is confirmed. When the number of overlapped rows is "1" or more, the procedure goes to Step S10, and when it is "0", the procedure goes to Step S12.

Figure 7:
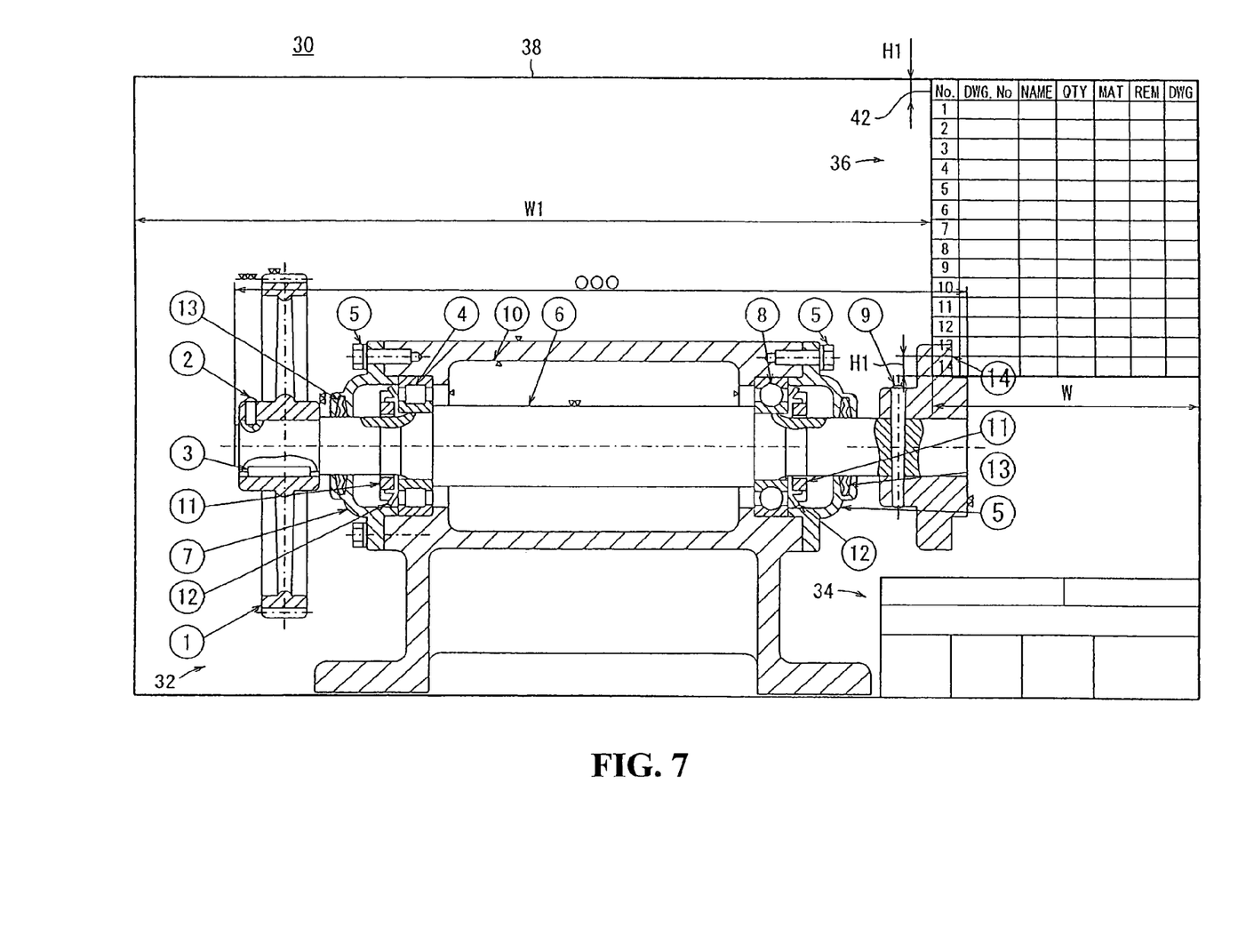
FIG. 7 is a mechanical drawing in which the height of the part table is reduced.

In Step S10, whether or not line-feeding to the direction specified in Step S7 is possible is confirmed. In other words, whether the width W (see FIG. 7) of the part table 36 is secured from the end of the part table 36 in the line-feeding direction to the drawing frame 38 is confirmed. For example, when the part table 36 is to be line-fed to the left and the part table 36 is provided at the right end, since a sufficiently wide width W1 (>W) is secured from the end in the line-feeding direction to the drawing frame 38 as shown in FIG. 7, it is determined that the line-feeding is possible. Thus, the procedure goes to Step S11. On the other hand, since the rightward line-feeding is not possible, the procedure goes to Step S13.

Figure 8:
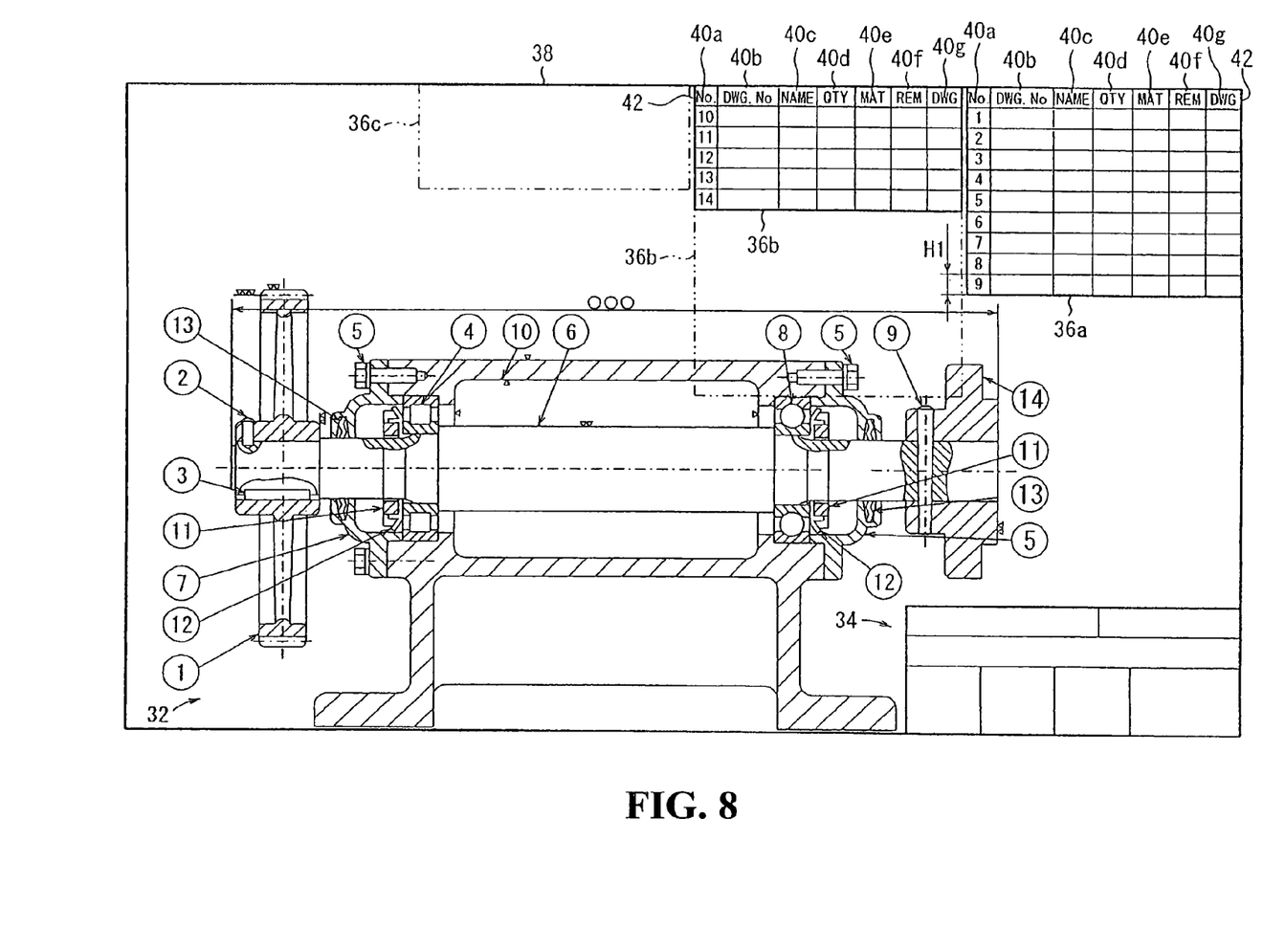
FIG. 8 is a mechanical drawing in which the part table is line-fed.

In Step S11, the portion of the overlapped rows obtained by the number of rows detecting means 54 is line fed in the specified direction. That is, as shown in FIG. 8, the four overlapped rows from the bottom in the original part table 36 is moved in the specified direction (for example, leftward), and moves so that the original 10th to 14th rows comes to the left side of the first to the fourth rows adjacently. The index row 42 is copied as it were to the left side. The reason of aligning the upper ends of the line-feeding destination and the line-feeding source is that it is eye-friendly for the operator.

The destination of the line-feeding as described above is referred to as a destination part table 36b and the portion remaining at the reference position without being line fed is referred to as original part table 36a so as to discriminate therebetween. The original part table 36a and the destination part table 36b are slightly apart from each other so as to ensure a discrimination therebetween, or may be expressed by a different line from other portions (such as a thick line or double line).

After having performed the line-feeding, the original part table 36a is fixed, and then the procedure goes back to Step S8 to continue the process for the destination part table 36b.

In other words, whether or not there is an overlap of the destination part table 36b further with the geometric element 32 is inspected, and when there is an overlap, a further line-feeding and movement are preformed to obtain the destination part table 36c (see imaginary line in FIG. 8). When there is no overlap, the procedure goes from Step S9 to Step S12, and the destination part tables 36b, 36c, obtained by line-feeding thus far are registered in the CAD data to end the process shown in FIG. 5 and FIG. 6.

On the other hand, in Step S13 (when line-feeding cannot be performed in the specified direction), whether or not the line-feeding in the opposite direction from the direction specified in Step S7 is possible is confirmed. In other words, whether or not the width W is secured in a space to the drawing frame 38 on the opposite side from the specified direction is confirmed. When the line-feeding in the opposite direction is possible, the procedure goes to Step S14, and when the line-feeding is not possible, the procedure goes to Step S15.

In Step S14, the line-feeding in the opposite direction from the specified direction is performed. The process in the Step S14 is the same process as the process in the above-described Step S11 other than that the direction of the line-feeding is opposite. After the process in Step S14, the procedure goes back to Step S8.

Figure 9:
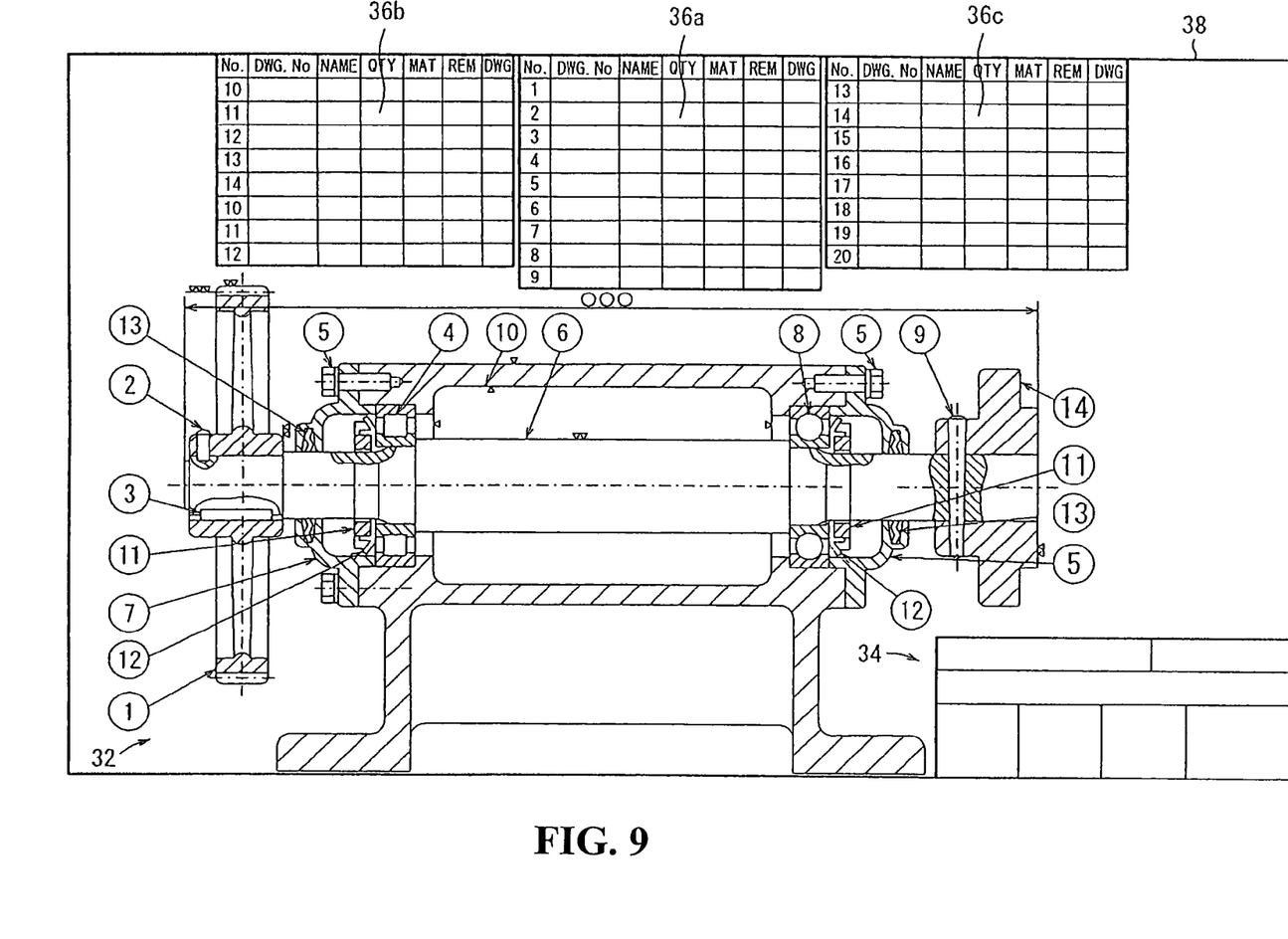
FIG. 9 is a mechanical drawing in which the line-feeding of the part table in the specified leftward direction is performed once, and then the rightward line-feeding is performed again.

By performing the line-feeding in the opposite direction, for example, even in a case in which the overlapped portion still exists after having performed the line-feeding once to the left as specified and further to the left the line-feeding is not possible as shown in FIG. 9, if there is a space in the rightward direction, the line-feeding is performed, whereby the original part table 36a and the two destination part tables 36b, 36c are displayed without being overlapped with the geometric element 32.

In Step S15, the destination part tables 36b, 36c obtained at that point are fixed as it were, and are registered in the CAD data, and the process shown in FIG. 5 and FIG. 6 is ended.

Information to be filled in the part table 36, the original part table 36a, and the destination part tables 36b, 36c may be edited by the detail edit window 60h. The editing operation in the detail edit window 60h may be performed when the part table 36 is set for the first time, or may be performed after a series of line-feeding process is finished.

Alternatively, the operator may confirm the result of line-feeding of the part table 36 on the display screen of the display 22 and adjust the number of rows to be line-fed by operating the number of line-feeding rows display window 60e (see FIG. 4) considering the preference or a layout balance.

As described above, according to the CAD system 10 and the part table creating method in this embodiment, when the overlap between the geometric element 32 and the part table 36 is detected, the overlap between the part table 36 and the geometric element 32 may be avoided automatically and adequately by separating and moving (line-feeding) the portion of the overlapped rows from other portion not overlapped. Therefore, even when there is not enough space for moving the geometric element 32 upward, downward, to the left, and to the right, the blank space is effectively used for displaying both the geometric element 32 and the part table 36 clearly without reducing the scale of the geometric element 32 or changing the setting of the paper size for the entire drawing to the paper one size bigger.

Since the direction of line-feeding can be specified by clicking the leftward line-feeding button 60c or the rightward line-feeding button 60d, the layout setting according to the preference of the operator is achieved. Thus, the layout flexibility is improved.

Furthermore, even when an overlap initially occurs, the height of the respective rows of the part table 36 can be reduced under the operation of the row contracting means 52. In this case, the layout change is reduced and the same layout is maintained as much as possible.

In the case wherein the geometric element 32 extends from the lowermost row side (that is, from the side of the 14th row) with respect to the part table 36, wherein an overlap occurs as has been described above, the overlap between the part table 36 and the geometric element 32 is not limited thereto. For example, even when the geometric element 32 extends from the left side and hence is overlapped only in the middle rows of the part table 36, the overlap can be avoided in the same procedure as described above. The geometric element 32 may be the one expressed by three-dimensional data (so called "3D-CAD) as a matter of course.

The part table creating apparatus and the part table creating method according to the invention can be modified in various configurations without departing from the scope of the invention as a matter of course.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A part table creating apparatus for creating a part table showing specifications of a plurality of components of a geometric element in a plurality of rows by each component on CAD data, comprising:

means for detecting an overlap of the part table and the geometric element;

row contracting means for reducing the height of the rows in the part table when the overlap is detected by the detecting means;

means for finding the number of rows overlapping with the geometric element from the plurality of rows of the part table when the overlap is still detected by the detecting means after the row contracting means reduces the height of the rows in the part table; and means for separating a portion of the components corresponding to the overlapped rows from the part table, moving the portion of the components corresponding to the overlapped rows to a position which avoids an overlap with the geometric element without moving the rest of the components corresponding to non-overlapped rows from the part table, and creating a new part table, wherein the portion of the overlapped rows is moved in a direction to avoid the overlap with the geometric element only when the overlap still exists after the height of the rows of the part table is reduced to a predetermined height by the row contracting means.

2. The part table creating apparatus according to claim 1, comprising:
input means used by an operator;
wherein the means for separating determines a direction to move the portion of the overlapped rows on the basis of information obtained from the input means.

3. The part table creating apparatus according to claim 1, wherein the part table is normally positioned as a column with a predetermined number of rows disposed in an upper corner of a display and the part table may be reconfigured to be separated into a plurality of columns each containing less than the predetermined number of rows for avoiding an overlap with the other geometric element.

4. The part table creating apparatus according to claim 1, wherein the part table creating apparatus includes an initial setting unit for the part table, the means for detecting an overlap and row contracting means for reducing a height of the respective rows when the overlap is detected by the means for detecting the overlap.

5. The part table creating apparatus according to claim 4, wherein the initial setting unit performs an initial setting in accordance with the number of geometric elements and provides the part table initially at a default position.

6. The part table creating apparatus according to claim 1, and further including line-feeding means for moving the portion of the overlapped rows obtained by the means for finding the number of rows overlapping in a direction for avoiding the overlap with the geometric element.

7. The part table creating apparatus according to claim 6, and further including a line-feeding direction determining unit for determining a direction of line-feeding by the line-feeding means based on input from an input means used by an operator.

8. The part table creating apparatus according to claim 7, wherein the line-feeding direction determining unit displays a setting dialogue box on a display screen of a display for inputting information from the input means.

9. A part table creating apparatus for creating a part table showing specifications of a plurality of components of a geometric element in a plurality of rows by each component on CAD data, comprising:
a detector detecting an overlap of the part table and the geometric element;
a row contracting unit reducing the height of the rows in the part table when the overlap is detected by the detector;
a locator finding the number of rows overlapping with the geometric element from the plurality of rows of the part table when the overlap is still detected by the detector after the row contracting unit reduces the height of the rows in the part table; and
a separator separating a portion of the components corresponding to the overlapped rows from the part table and moving the portion of the components corresponding to the overlapped rows to a position which avoids an overlap with the geometric element without moving the rest of the components corresponding to non-overlapped rows from the part table, and creating a new part table, wherein the portion of the overlapped rows is moved in a direction to avoid the overlap with the geometric element only when the overlap still exists after the height of the rows of the part table is reduced to a predetermined height by the row contracting device.

10. The part table creating apparatus according to claim 9, comprising:
an input device used by an operator;
wherein the separator determines a direction to move the portion of the overlapped rows on the basis of information obtained from the input device.

11. The part table creating apparatus according to claim 9, wherein the part table is normally positioned as a column with a predetermined number of rows disposed in an upper corner of a display and the part table may be reconfigured to be separated into a plurality of columns each containing less than the predetermined number of rows for avoiding an overlap with the other geometric element.

12. The part table creating apparatus according to claim 9, wherein the part table creating apparatus includes an initial setting unit for the part table, the detector for detecting an overlap and row contractor for reducing a height of the respective rows when the overlap is detected by the detector for detecting the overlap.

13. The part table creating apparatus according to claim 12, wherein the initial setting unit performs an initial setting in accordance with the number of geometric elements and provides the part table initially at a default position.

14. The part table creating apparatus according to claim 9, and further including line-feeding device for moving the portion of the overlapped rows obtained by the locator for finding the number of rows overlapping in a direction for avoiding the overlap with the geometric element.

15. The part table creating apparatus according to claim 14, and further including a line-feeding direction determining unit for determining a direction of line-feeding by the line-feeding device based on input from an input device used by an operator.

16. A part table creating method for creating a part table showing specifications of a plurality of components of a geometric element in a plurality of rows by each component on CAD data, comprising the following steps:
detecting an overlap of the part table with the geometric element;
reducing the height of the rows in the part table when the overlap is detected;
obtaining the number of rows overlapped with the geometric element when the overlap is still detected after the step of reducing the height of the rows in the part table;
separating a portion of the components corresponding to the overlapped rows from the part table; and
moving the portion of the components corresponding to the overlapped rows to a position which avoids an overlap with the geometric element without moving the rest of the components corresponding to non-overlapped rows from the part table,
wherein the portion of the overlapped rows is moved in a direction to avoid the overlap with the geometric element only when the overlap still exists after the height of the rows of the part table is reduced to a predetermined height by the row contracting device.

* * * * *